(12) United States Patent
O'Connor et al.

(10) Patent No.: US 12,510,021 B2
(45) Date of Patent: Dec. 30, 2025

(54) FUEL OXYGEN REDUCTION UNIT FOR PRESCRIBED OPERATING CONDITIONS

(71) Applicant: General Electric Company, Schenectady, NY (US)

(72) Inventors: Ethan Patrick O'Connor, Hamilton, OH (US); Brandon Wayne Miller, Liberty Township, OH (US); Daniel Alan Niergarth, Norwood, OH (US); Alfred Albert Mancini, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 86 days.

(21) Appl. No.: 18/459,925

(22) Filed: Sep. 1, 2023

(65) Prior Publication Data
US 2023/0407785 A1 Dec. 21, 2023

Related U.S. Application Data

(62) Division of application No. 16/864,541, filed on May 1, 2020, now Pat. No. 11,773,776.

(51) Int. Cl.
*F02C 3/22* (2006.01)
*B01D 19/00* (2006.01)
(Continued)

(52) U.S. Cl.
CPC .............. *F02C 3/22* (2013.01); *B01D 19/0005* (2013.01); *C10G 25/00* (2013.01); *F23K 5/08* (2013.01);
(Continued)

(58) Field of Classification Search
CPC .... F02C 7/22; F02C 7/224; F02C 9/26; F02C 9/263; F02C 9/28; F02C 9/44; F02C 3/22; F23R 3/04; F23K 5/08; F23K 5/10
See application file for complete search history.

(56) References Cited

U.S. PATENT DOCUMENTS 2,582,842 A 1/1952 Messinger
2,720,313 A 10/1955 Pattison
(Continued)

FOREIGN PATENT DOCUMENTS

EP 2003311 A2 12/2008
EP 3018304 A1 5/2016
(Continued)

OTHER PUBLICATIONS

Kelburn Engineering, Landfill, Sewage, Biogas, Coal, Seam & Mines Gas Separation/Filtration, Kelburn Engineering—LandfillGas and Air Separation, 3 pages. www.kelburneng.uk/landfill-gas-bio-gas-sewer-gas.php.

*Primary Examiner* — Thuyhang N Nguyen
(74) *Attorney, Agent, or Firm* — Dority & Manning, P.A.

(57) ABSTRACT

A fuel oxygen reduction unit for an engine is provided. The fuel oxygen reduction unit includes an inlet fuel line; a stripping gas source; a contactor selectively in fluid communication with the stripping gas source, the inlet fuel line, or both to form a fuel/gas mixture; and a separator that receives the fuel/gas mixture, the separator configured to separate the fuel/gas mixture into an outlet stripping gas flow and an outlet fuel flow; wherein a flow of stripping gas passes through the fuel oxygen reduction unit a single time.

20 Claims, 8 Drawing Sheets

(51) Int. Cl.
 *C10G 25/00* (2006.01)
 *F23K 5/08* (2006.01)
(52) U.S. Cl.
 CPC .. *B01D 2257/104* (2013.01); *C10G 2300/202* (2013.01); *C10G 2400/08* (2013.01); *F05D 2220/323* (2013.01); *F05D 2240/35* (2013.01); *F05D 2270/07* (2013.01); *F23K 2900/05082* (2013.01)

(56) References Cited

U.S. PATENT DOCUMENTS

| | | |
|---|---|---|
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,732,668 A | 5/1973 | Nichols |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,264,844 A | 4/1981 | Axe et al. |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 5,974,780 A * | 11/1999 | Santos .................. F02C 7/22 60/39.59 |
| 6,125,624 A | 10/2000 | Prociw |
| 6,134,876 A | 10/2000 | Hines et al. |
| 6,182,435 B1 | 2/2001 | Niggemann et al. |
| 6,244,034 B1 | 6/2001 | Taylor et al. |
| 6,250,097 B1 | 6/2001 | Lui et al. |
| 6,294,091 B1 | 9/2001 | Hoff |
| 6,315,815 B1 * | 11/2001 | Spadaccini ............ B01D 61/00 96/6 |
| 6,415,595 B1 | 7/2002 | Wilmot, Jr. et al. |
| 6,435,454 B1 | 8/2002 | Engelhardt |
| 6,453,660 B1 | 9/2002 | Johnson et al. |
| 6,604,558 B2 | 8/2003 | Sauer |
| 6,701,717 B2 | 3/2004 | Flatman et al. |
| 6,702,729 B2 | 3/2004 | Mazzuca |
| 6,820,659 B2 | 11/2004 | Sauer |
| 6,892,710 B2 | 5/2005 | Ekstam |
| 6,939,392 B2 | 9/2005 | Huang et al. |
| 7,093,437 B2 | 8/2006 | Spadaccini et al. |
| 7,114,337 B2 | 10/2006 | Cazalens et al. |
| 7,153,343 B2 * | 12/2006 | Burlatsky .......... B01D 19/0031 96/6 |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,478,525 B2 | 1/2009 | Iya et al. |
| 7,509,795 B2 | 3/2009 | Allen |
| 7,520,136 B2 | 4/2009 | Kervistin et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,726,112 B2 | 6/2010 | Dooley |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,891,191 B2 | 2/2011 | Yoshida et al. |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,015,813 B2 | 9/2011 | Cazalens et al. |
| 8,047,003 B2 | 11/2011 | Yoshida et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,242,404 B2 | 8/2012 | Miller et al. |
| 8,261,258 B1 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-Wlam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,759,130 B2 | 9/2017 | Appukuttan et al. |
| 9,765,691 B2 | 9/2017 | Delgado et al. |
| 9,771,867 B2 | 9/2017 | Karam et al. |
| 9,834,315 B2 | 12/2017 | Lo et al. |
| 9,863,322 B2 | 1/2018 | Williams et al. |
| 9,885,290 B2 | 2/2018 | Della-Fera et al. |
| 9,897,054 B2 | 2/2018 | Lo et al. |
| 10,060,618 B2 | 8/2018 | Juan |
| 10,400,672 B2 | 9/2019 | Frish et al. |
| 11,254,568 B2 | 2/2022 | Finnerty et al. |
| 11,352,960 B2 | 6/2022 | Mancini et al. |
| 2005/0247197 A1 | 11/2005 | Snow, Jr. |
| 2006/0113248 A1 | 6/2006 | Koenig et al. |
| 2007/0006591 A1 | 1/2007 | Spadaccini et al. |
| 2007/0101731 A1 * | 5/2007 | Bayt .................. B64D 37/32 62/7 |
| 2007/0130956 A1 | 6/2007 | Chen |
| 2009/0020013 A1 | 1/2009 | Sloan |
| 2009/0133380 A1 | 5/2009 | Donnerhack |
| 2009/0158739 A1 | 6/2009 | Messmer |
| 2009/0165436 A1 | 7/2009 | Herbon et al. |
| 2009/0188234 A1 | 7/2009 | Suciu et al. |
| 2010/0101231 A1 | 4/2010 | Westmeier |
| 2010/0107592 A1 | 5/2010 | Botero et al. |
| 2010/0175386 A1 | 7/2010 | Haynes |
| 2010/0212857 A1 | 8/2010 | Bulin et al. |
| 2010/0294128 A1 | 11/2010 | Schmidt et al. |
| 2010/0313591 A1 | 12/2010 | Lents et al. |

(56) References Cited

U.S. PATENT DOCUMENTS

| | | |
|---|---|---|
| 2011/0262309 A1 | 10/2011 | Limaye et al. |
| 2012/0000205 A1* | 1/2012 | Coffinberry ............ B64D 13/06 60/806 |
| 2012/0006935 A1* | 1/2012 | Bhargava ............... B64D 41/00 244/50 |
| 2012/0210716 A1* | 8/2012 | Weir ........................ F02C 7/22 60/734 |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2013/0200216 A1 | 8/2013 | Mock et al. |
| 2014/0165570 A1 | 6/2014 | Herring |
| 2014/0190162 A1* | 7/2014 | Fonseca ................. B64D 15/02 60/273 |
| 2014/0205446 A1 | 7/2014 | Patsouris et al. |
| 2014/0230400 A1 | 8/2014 | Light et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2015/0192300 A1* | 7/2015 | Max ........................ F23D 14/24 60/737 |
| 2015/0375868 A1 | 12/2015 | Smith et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0129372 A1* | 5/2016 | Lo ...................... B01D 19/0057 96/204 |
| 2016/0138431 A1 | 5/2016 | Lear, Jr. |
| 2016/0167802 A1 | 6/2016 | Lo et al. |
| 2016/0201917 A1 | 7/2016 | Dautova et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0290235 A1 | 10/2016 | Ekanayake et al. |
| 2016/0305440 A1 | 10/2016 | Laboda et al. |
| 2016/0356224 A1 | 12/2016 | Farnum et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0116617 A1* | 4/2017 | Nance .................. G06Q 30/018 |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0191419 A1 | 7/2017 | Bayraktar et al. |
| 2017/0291714 A1 | 10/2017 | Corman |
| 2017/0321607 A1 | 11/2017 | Sweeney et al. |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2019/0153952 A1 | 5/2019 | Niergarth et al. |
| 2019/0153953 A1 | 5/2019 | Niergarth et al. |
| 2019/0277201 A1* | 9/2019 | Veilleux, Jr. ........... B64D 37/32 |
| 2019/0389593 A1 | 12/2019 | Emerson et al. |
| 2020/0086239 A1 | 3/2020 | Cordatos et al. |

FOREIGN PATENT DOCUMENTS

| | | |
|---|---|---|
| EP | 3075957 A1 | 10/2016 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

\* cited by examiner

FIG. 3B  MEMBRANE

FUEL OXYGEN REDUCTION UNIT FOR PRESCRIBED OPERATING CONDITIONS

CROSS-REFERENCE TO RELATED APPLICATIONS

The present application is a continuation of and claims priority to U.S. application Ser. No. 16/864,541 entitled "Fuel Oxygen Reduction Unit for Prescribed Operating Conditions", filed May 1, 2020, the entire disclosure of which is hereby expressly incorporated by reference herein.

FIELD OF THE INVENTION

The present subject matter relates generally to a fuel oxygen reduction unit for an engine and a method of operating the same.

BACKGROUND OF THE INVENTION

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a fuel oxygen reduction unit for an engine is provided. The fuel oxygen reduction unit includes an inlet fuel line; a stripping gas source; a contactor selectively in fluid communication with the stripping gas source, the inlet fuel line, or both to form a fuel/gas mixture; and a separator that receives the fuel/gas mixture, the separator configured to separate the fuel/gas mixture into an outlet stripping gas flow and an outlet fuel flow; wherein a flow of stripping gas passes through the fuel oxygen reduction unit a single time.

In certain exemplary embodiments the fuel oxygen reduction unit includes a valve downstream of the stripping gas source and upstream of the contactor, wherein the valve is transitionable between a closed position in which the stripping gas source is not in fluid communication with the contactor, and an open position in which the stripping gas flows to the contactor.

In certain exemplary embodiments the valve transitions to the open position at a prescribed operating condition.

In certain exemplary embodiments the prescribed operating condition is a weight on wheels condition.

In certain exemplary embodiments the prescribed operating condition is an engine speed condition.

In certain exemplary embodiments the prescribed operating condition is a wind down condition of the engine.

In certain exemplary embodiments the fuel oxygen reduction unit defines a maximum continuous operating time of one hour or less.

In certain exemplary embodiments the separator includes an inlet in fluid communication with the contactor that receives the fuel/gas mixture, a fuel outlet, and a stripping gas outlet, wherein the separator is configured to separate the fuel/gas mixture into an outlet stripping gas flow and an outlet fuel flow and provide the outlet stripping gas flow to the stripping gas outlet and the outlet fuel flow to the fuel outlet.

In certain exemplary embodiments the outlet stripping gas flow is vented out to atmosphere downstream of the separator.

In certain exemplary embodiments the stripping gas source comprises a rechargeable bottle of inert gas.

In certain exemplary embodiments the stripping gas source comprises an inert gas generator.

In certain exemplary embodiments the outlet fuel flow has a lower oxygen content than the inlet fuel flow, and wherein the outlet stripping gas flow has a higher oxygen content than the inlet stripping gas flow.

In another exemplary embodiment of the present disclosure, a fuel oxygen reduction system for an engine is provided. The fuel oxygen reduction system includes an inlet fuel line; a stripping gas source; a contactor selectively in fluid communication with the stripping gas source, the inlet fuel line, or both to form a fuel/gas mixture; a separator that receives the fuel/gas mixture, the separator configured to separate the fuel/gas mixture into an outlet stripping gas flow and an outlet fuel flow; and a storage tank that receives the outlet fuel flow.

In certain exemplary embodiments the stripping gas source comprises an inert gas generator.

In certain exemplary embodiments the fuel oxygen reduction system includes a primary tank containing a primary fuel flow; and a valve downstream of the storage tank and the primary tank, wherein the valve is transitionable between a first position in which the primary tank is in fluid communication with the engine, and a second position in which the storage tank is in fluid communication with the engine.

In certain exemplary embodiments the valve transitions to the second position at a prescribed operating condition.

In certain exemplary embodiments the prescribed operating condition is a weight on wheels condition.

In certain exemplary embodiments the prescribed operating condition is an engine speed condition.

In certain exemplary embodiments the primary tank defines a first volume, wherein the storage tank defines a second volume, and wherein the second volume is less than 20% of the first volume.

In certain exemplary embodiments the separator includes an inlet in fluid communication with the contactor that receives the fuel/gas mixture, a fuel outlet, and a stripping gas outlet, wherein the separator is configured to provide the outlet stripping gas flow to the stripping gas outlet and the outlet fuel flow to the storage tank via the fuel outlet.

In an exemplary aspect of the present disclosure, a method is provided for operating a fuel delivery system for a gas turbine engine. The method includes receiving an inlet fuel flow in a fuel oxygen reduction unit for reducing an amount of oxygen in the inlet fuel flow using a stripping gas flow through a stripping gas flowpath; and passing the stripping gas flow through the fuel oxygen reduction unit a single time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3B is a schematic view of an inert gas generator in accordance with an exemplary embodiment of the present disclosure.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Figure 1:
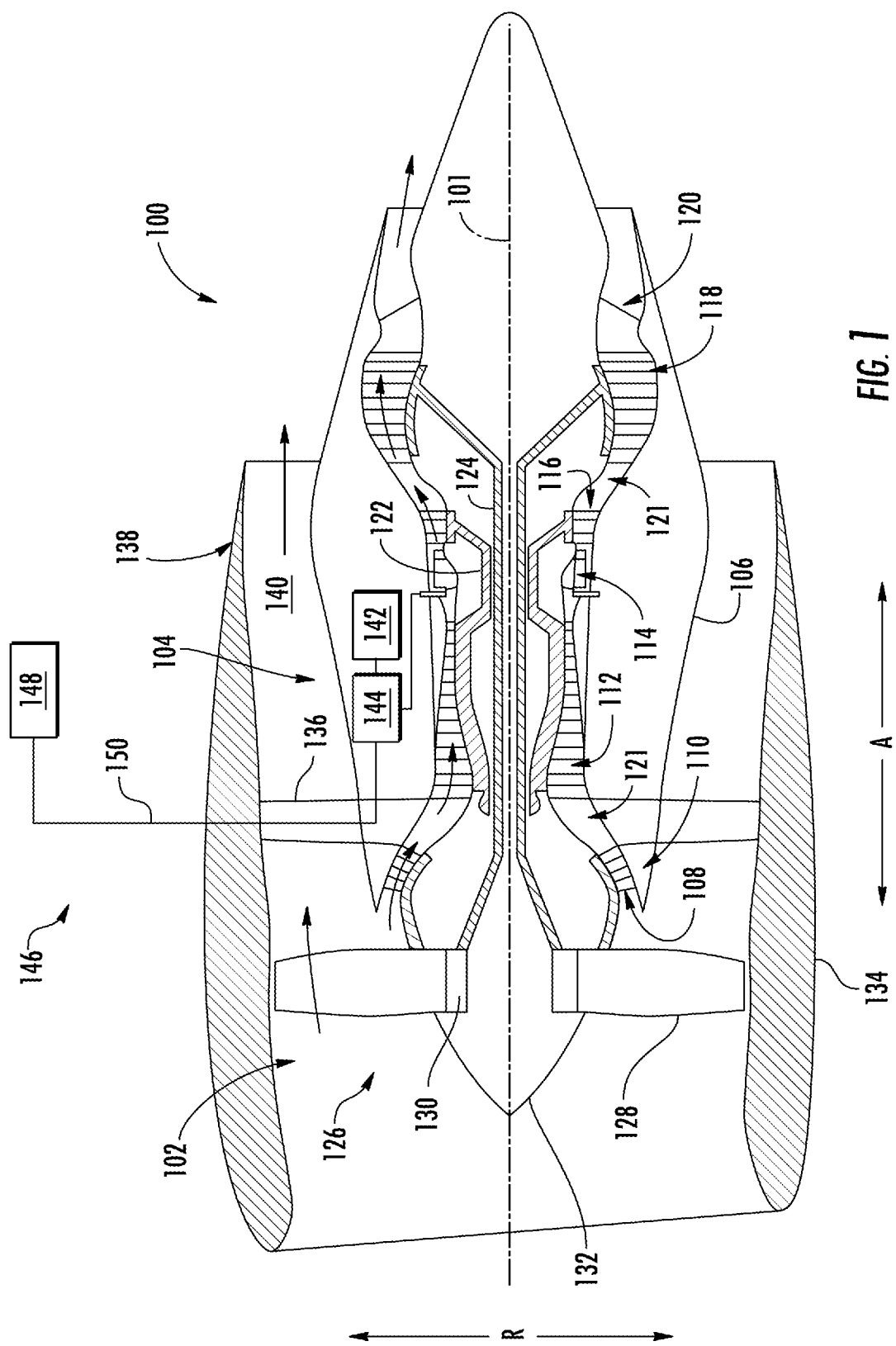
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In a fuel oxygen reduction unit of the present disclosure, the fuel oxygen reduction unit is a static system that is configured and sized for operating, e.g., deoxygenating fuel, at a prescribed operating condition. Additionally, the fuel oxygen reduction unit of the present disclose can be retrofitted on existing engine systems and/or incorporated into a new engine system.

In a fuel oxygen reduction system of the present disclosure, the fuel oxygen reduction system provides a system that continuously deoxygenates fuel and then stores the deoxygenated fuel in a storage tank. This deoxygenated fuel stored in the storage tank is then provided to an engine at a prescribed operating condition.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft.

For the embodiment depicted, the engine is configured as a high bypass turbofan engine 100. As shown in FIG. 1, the turbofan engine 100 defines an axial direction A (extending parallel to a longitudinal centerline or axis 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 101 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen reduction unit or system 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen reduction unit 144 may be coupled to, or otherwise rotatable with, the accessory gearbox 142. In such a manner, it will be appreciated that the exemplary fuel oxygen reduction unit 144 may be driven by the accessory gearbox 142. In other exemplary embodiments, the exemplary fuel oxygen reduction unit 144 may be driven by other sources. Notably, as used herein, the term "fuel oxygen conversion" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100. In exemplary engine configurations, the combustion section 114 includes a plurality of fuel nozzles circumferentially about the centerline axis 101. These fuel nozzles define a plurality of fuel flow passages that define a volume, such that when fuel flow to the nozzle ceases, a volume of fuel remains within the nozzle.

During typical operations in such configurations, the primary fuel oxygen reduction unit 144 may operate to reduce an oxygen content of a fuel flow to the combustion section 114, and more particularly to such fuel nozzles. During a wind down condition, however, it may be necessary to further reduce an oxygen content of the fuel. For example, depending on, e.g., a thermal mass of a core of the engine 100 and a turbine inlet temperature during an idle condition of the engine, heat from the core of the engine 100 may "soak-back" to these fuel nozzles, heating the volume of fuel remaining within the fuel nozzles to a point that the volume of fuel remaining within the fuel nozzles would coke unless an oxygen content of such volume of fuel is reduced below the levels provided by an exemplary fuel oxygen reduction unit 144 of the present disclosure.

Accordingly, an exemplary fuel oxygen reduction unit 144 of the present disclosure may be operated during the wind down condition to ensure that the volume of fuel remaining within the fuel nozzle after the engine has shut down is sufficiently low to prevent the fuel flow coking or otherwise deteriorating past an undesired level when the heat from the core of the engine 100 soaks-back to such fuel nozzles.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the fuel oxygen reduction unit 144 positioned within the turbomachine 104, i.e., within the casing 106 of the turbomachine 104, in other embodiments, the fuel oxygen reduction unit 144 may be positioned at any other suitable location. For example, in other embodiments, the fuel oxygen reduction unit 144 may instead be positioned remote from the turbofan engine 100, such as proximate to, or within, the tank of the fuel delivery system 146. Additionally, in other embodiments, the fuel oxygen reduction unit 144 may additionally or alternatively be driven by other suitable power sources such as an electric motor, a hydraulic motor, or an independent mechanical coupling to the HP or LP shaft, etc.

Figure 2:
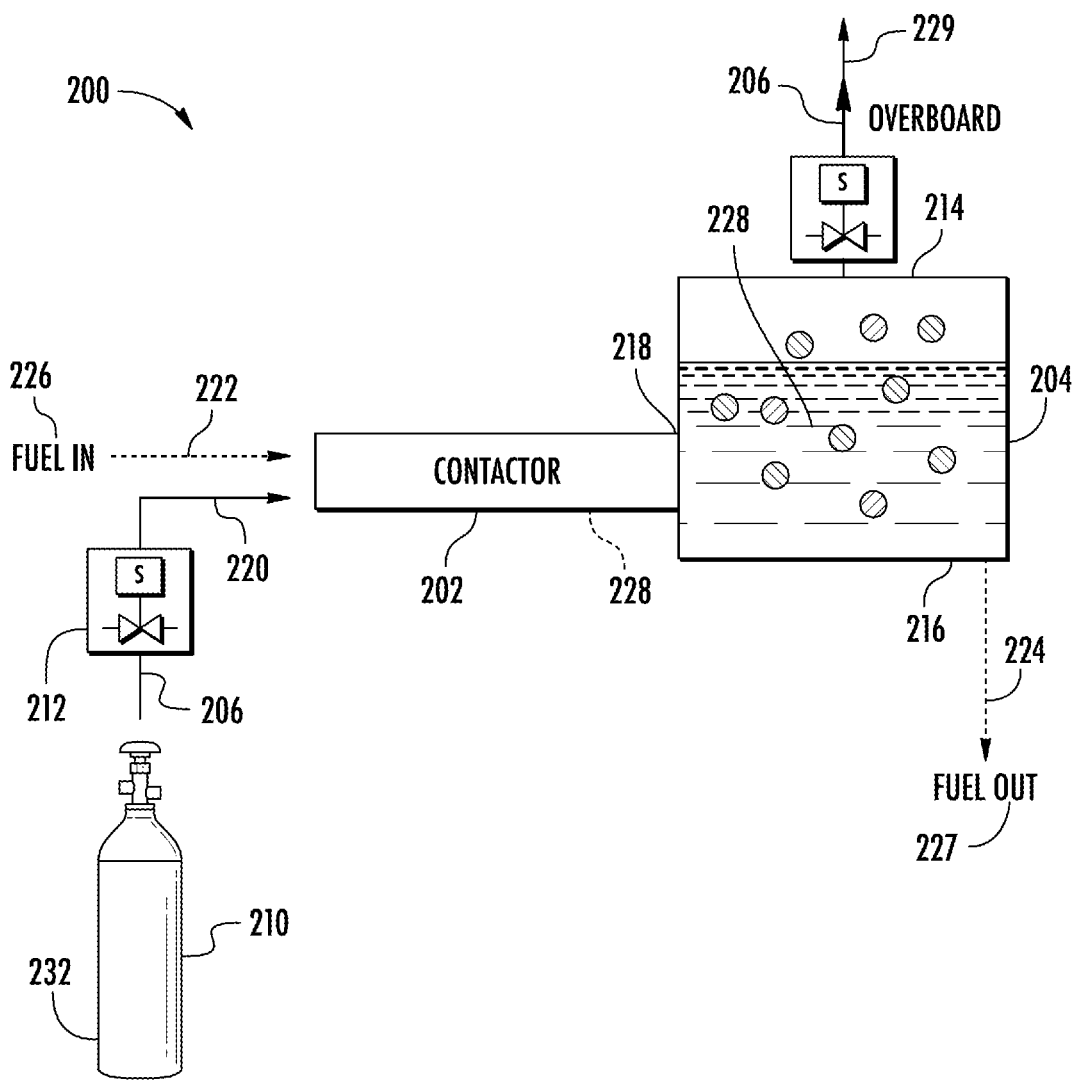
FIG. 2 is a schematic view of a fuel oxygen reduction unit in accordance with an exemplary embodiment of the present disclosure.

Referring now to FIG. 2, a schematic drawing of a fuel oxygen reduction unit 200 for a gas turbine engine in accordance with an exemplary embodiment of the present disclosure is provided. In at least certain exemplary embodiments, the exemplary fuel oxygen reduction unit 200 depicted may be incorporated into, e.g., the exemplary engine 100 described above with reference to FIG. 1 (e.g., may be the fuel oxygen reduction unit 144 depicted in FIG. 1 and described above). Fuel oxygen reduction unit 200 of the present disclose may be a static system that is configured and sized for operating at a prescribed operating condition. Additionally, fuel oxygen reduction unit 200 of the present disclose can be retrofitted on existing engine systems and/or incorporated into a new engine system.

As will be appreciated from the discussion herein, in an exemplary embodiment, the exemplary fuel oxygen reduction unit 200 of FIG. 2 generally includes a contactor 202, a separator 204, a stripping gas source 210, and a valve 212. In an exemplary embodiment, the exemplary fuel oxygen reduction unit 200 generally defines a single pass gas flowpath or single pass system 206 from the stripping gas source 210 to the contactor 202 and out the separator 204 as described herein. In particular, for the embodiment shown, the fuel oxygen reduction unit 200 is configured to pass a flow of stripping gas through the fuel oxygen reduction unit 200 a single time. For example, the flow of stripping gas passes through the fuel oxygen reduction unit 200 a single time and then may be exited from the system to atmosphere.

In such a manner, it will be appreciated that the term "a single time" as used with respect to the passing of a stripping gas flow through the fuel oxygen reduction unit refers to the stripping gas flow not being recirculated in a continuous manner throughout all flight periods/operation modes of an engine and/or aircraft incorporating the fuel oxygen reduction unit 200. In such a manner, it will be appreciated that the term "a single time" as used with respect to the passing of a stripping gas flow through the fuel oxygen reduction unit may refer to the stripping as not being recirculated through the fuel oxygen reduction unit 200 during operation (i.e., not providing an outlet stripping gas flow 229 back as an inlet flow of stripping gas 220 to the contactor 202). It will also be appreciated that the term "a single time" as used with respect to the passing of a stripping gas flow through the fuel oxygen reduction unit refers to passing a stripping gas flow through a fuel oxygen reduction unit devoid of gas oxygen reduction features, such as catalysts, pre-heaters, membranes, or similar features. Additionally or alternatively, it will be appreciated that the term "a single time" as used with respect to the passing of a stripping gas flow through the fuel oxygen reduction unit may refer to a particular volume of stripping gas only being used one particular flight period or flight mission of an aircraft incorporating the fuel oxygen reduction unit. For example, the flight period or flight mission may be a wind down condition of the engine operable with/incorporating the fuel oxygen reduction unit. Such may ensure a relatively low oxygen content fuel is left in the engine at shutdown, such that a risk of damage to certain components of the engine (such as the fuel nozzles) is minimized as a result of heat soak-back at shutdown. Additionally or alternatively, still, it will be appreciated that the term "a single time" as used with respect to the passing of a stripping gas flow through the fuel oxygen reduction unit may refer to a particular volume of the stripping gas flow only being used for a single time period, such as one (1) hour or less, or thirty (30) minutes or less. Accordingly, it will be appreciated that in at least one exemplary embodiment, the fuel oxygen reduction unit 200 defines a maximum continuous operating time of one hour or less.

In exemplary embodiments, the contactor 202 may be configured in any suitable manner to substantially mix a received gas and liquid flow. For example, the contactor 202 may, in certain embodiments, be a mechanically driven contactor (e.g., having paddles for mixing the received flows), or alternatively may be a passive contactor for mixing the received flows using, at least in part, a pressure and/or flowrate of the received flows. For example, a passive contactor may include one or more turbulators, a venturi mixer, etc.

It will be appreciated that the fuel oxygen reduction unit 200 generally provides for a flow of stripping gas 220 to the contactor 202 for mixing with a fuel flow during operation. It will be appreciated that the term "stripping gas" is used herein as a term of convenience to refer to a gas generally capable of performing the functions described herein. The stripping gas 220 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide ($CO_2$), a gas mixture made up of at least 50% by mass inert gas, or some other gas or gas mixture having a relatively low oxygen content.

Referring to FIG. 2, in an exemplary embodiment, the separator 204 generally includes a stripping gas outlet 214, a fuel outlet 216, and an inlet 218. It will also be appreciated that the exemplary fuel oxygen reduction unit 200 depicted is operable with a fuel delivery system 146, such as a fuel delivery system 146 of the gas turbine engine including the fuel oxygen reduction unit 200 (see, e.g., FIG. 1). The exemplary fuel delivery system 146 generally includes a plurality of fuel lines, and in particular, an inlet fuel line 222 and an outlet fuel line 224. The inlet fuel line 222 is fluidly connected to the contactor 202 for providing a flow of liquid fuel or inlet fuel flow 226 to the contactor 202 (e.g., from a fuel source, such as a fuel tank) and the outlet fuel line 224 is fluidly connected to the fuel outlet 216 of the separator 204 for receiving a flow of deoxygenated liquid fuel or outlet fuel flow 227.

Moreover, during typical operations, a flow of stripping gas 220 flows to the contactor 202, wherein the stripping gas 220 is mixed with the flow of inlet fuel 226 from the inlet fuel line 222 to generate a fuel gas mixture 228. The fuel gas mixture 228 generated within the contactor 202 is provided to the inlet 218 of the separator 204. The stripping gas source 210 is selectively in fluid communication with a stripping gas inlet of the contactor 202 for selectively introducing a stripping gas to the contactor 202.

For the embodiment depicted, the stripping gas source 210 is in fluid communication with the contactor 202 via the valve 212, which may be actuatable to supply the stripping gas flow 220 to the contactor 202 at a prescribed operating condition. Referring to FIG. 2, the valve 212 is downstream of the stripping gas source 210 and upstream of the contactor 202. The valve 212 is transitionable between a closed position in which the stripping gas source 210 is not in fluid communication with the contactor 202, and an open position in which the stripping gas 220 flows to the contactor 220. As described herein, the valve 212 transitions to the open position at a prescribed operating condition. In this manner, the fuel oxygen reduction unit 200 of the present disclosure operates only during desired engine parameters, e.g., parameters indicating the engine is at the end of the cycle. This enables the fuel oxygen reduction unit 200 of the present disclosure to be a static, smaller, and lighter unit to deoxygenate the fuel at the end of an engine cycle, for example, to prevent coking of the fuel. In other words, the fuel oxygen reduction unit 200 of the present disclosure lowers the oxygen content of the fuel, such that a relatively high amount of heat may be added thereto with a reduced risk of the fuel coking (i.e., chemically reacting to form solid particles which may clog up or otherwise damage components within the fuel flow path).

The prescribed operating condition can be any desired engine parameter. For example, the prescribed operating condition may be a weight on wheels condition indicating the end of an engine cycle. Also, the prescribed operating condition may be an engine speed condition, a wind down condition of the engine, time condition, or other engine parameter condition.

Generally, it will be appreciated that during operation of the fuel oxygen reduction unit 200, the inlet fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the inlet fuel 226 is mixed with the stripping gas 220, resulting in the fuel gas mixture 228. As a result of such mixing a physical exchange may occur whereby at least a portion of the oxygen within the inlet fuel 226 is transferred to the stripping gas 220, such that the fuel component of the mixture 228 has a relatively low oxygen content (as compared to the inlet fuel 226 provided through inlet fuel line 222) and the stripping gas component of the mixture 228 has a relatively high oxygen content (as compared to the inlet stripping gas 220 provided to the contactor 202).

Within the separator 204 the relatively high oxygen content stripping gas 220 is then separated from the relatively low oxygen content fuel 226 back into respective flows of an outlet stripping gas 229 and outlet fuel 227. The separator 204 is configured to separate the fuel/gas mixture 228 into an outlet stripping gas flow 229 and an outlet fuel flow 227 and provide the outlet stripping gas flow 229 to the stripping gas outlet 214 and the outlet fuel flow 227 to the fuel outlet 216. In an exemplary embodiment, the outlet stripping gas flow 229 is vented out to atmosphere downstream of the separator 204.

Further, it will be appreciated that the outlet fuel 227 provided to the fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the outlet fuel 227 provided to the fuel outlet 216 may have an oxygen content of less than about five (5) parts per million ("ppm"), such as less than about three (3) ppm, such as less than about two (2) ppm, such as less than about one (1) ppm, such as less than about 0.5 ppm.

Referring to FIG. 2, in an exemplary embodiment, the stripping gas source 210 is a rechargeable bottle of inert gas 232. The bottle of inert gas 232 could be positioned somewhere on the engine 100 or aircraft. The bottle 232 stores an amount of inert gas that is oxygen free, e.g., a CO2 or N2 gas. The bottle 232 can be recharged at standard intervals.

Figure 3A:
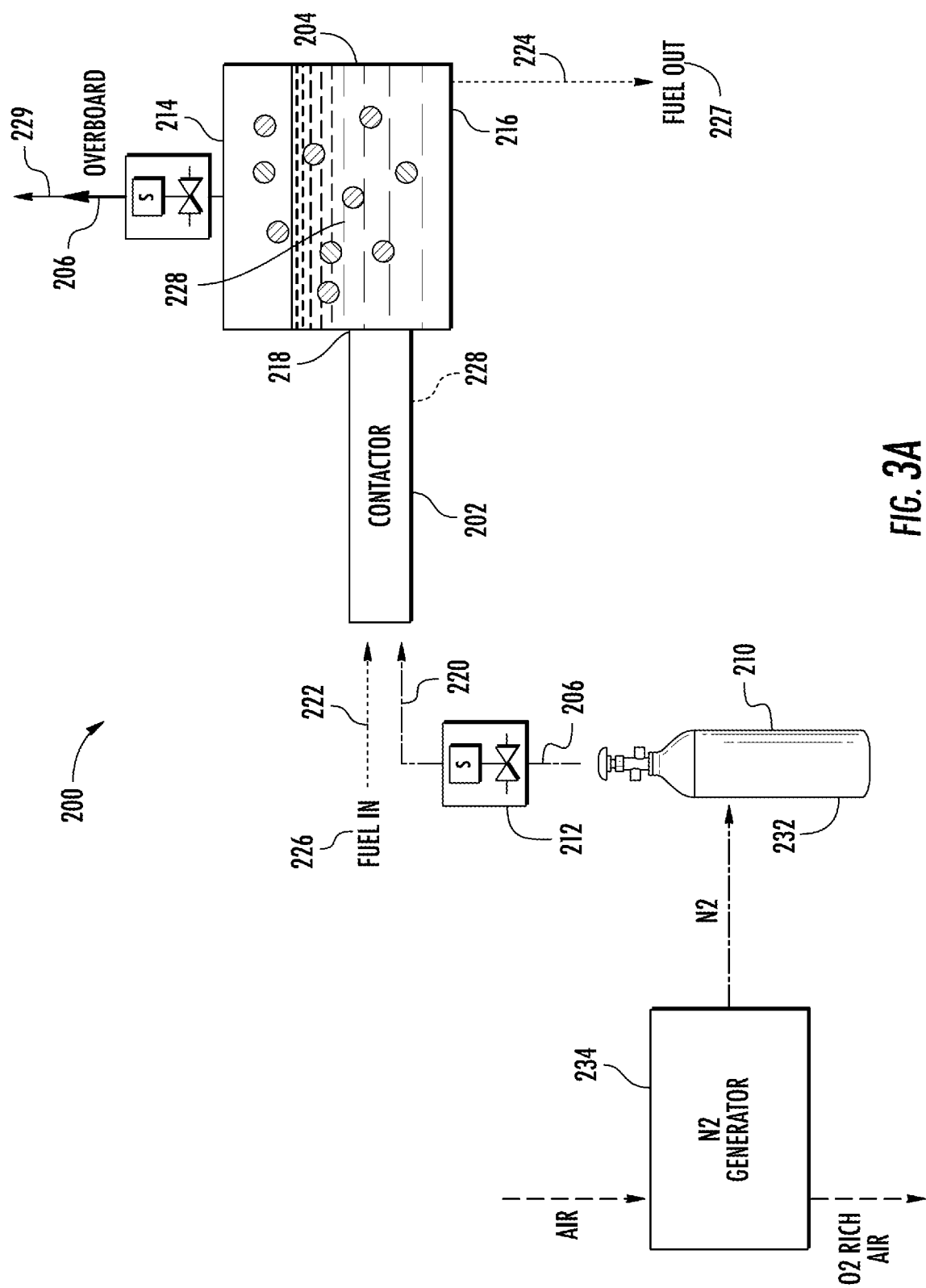
FIG. 3A is a schematic view of a fuel oxygen reduction unit in accordance with another exemplary embodiment of the present disclosure.

Referring to FIG. 3A, in an exemplary embodiment, the stripping gas source 210 is an inert gas generator 234. The inert gas generator 234 is able to take air from some source, e.g., air from atmosphere, air from a pump, air from the compressor bleed, and generate a continuous supply of inert gas. In an exemplary embodiment, the inert gas generator 234 is used to continuously replenish a supply of inert gas to the bottle of inert gas 232 described above.

For example, referring to FIG. 3B, in a first exemplary embodiment, the inert gas generator 234 is a membrane 236. The membrane 236 separates oxygen out from nitrogen, for example. In this manner, an oxygen free stripping gas is continuously provided to the system.

Figure 3C:
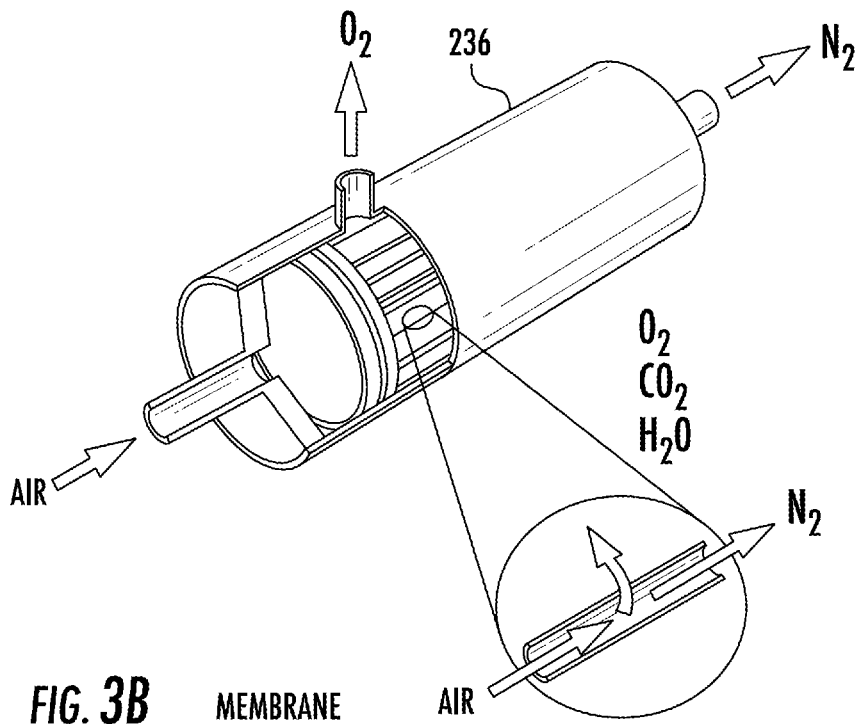
FIG. 3C is a schematic view of an inert gas generator in accordance with another exemplary embodiment of the present disclosure.

Referring to FIG. 3C, in a second exemplary embodiment, the inert gas generator 234 is a pressure swing adsorption (PSA) system 238. The PSA system 238 is used to separate a first gas species from a mixture of gases under pressure according to the species' molecular characteristics and affinity for an adsorbent material. The PSA system 238 of the present disclosure separates a gas such as nitrogen, for example, from oxygen. In this manner, an oxygen free stripping gas is continuously provided to the system.

Figure 4:
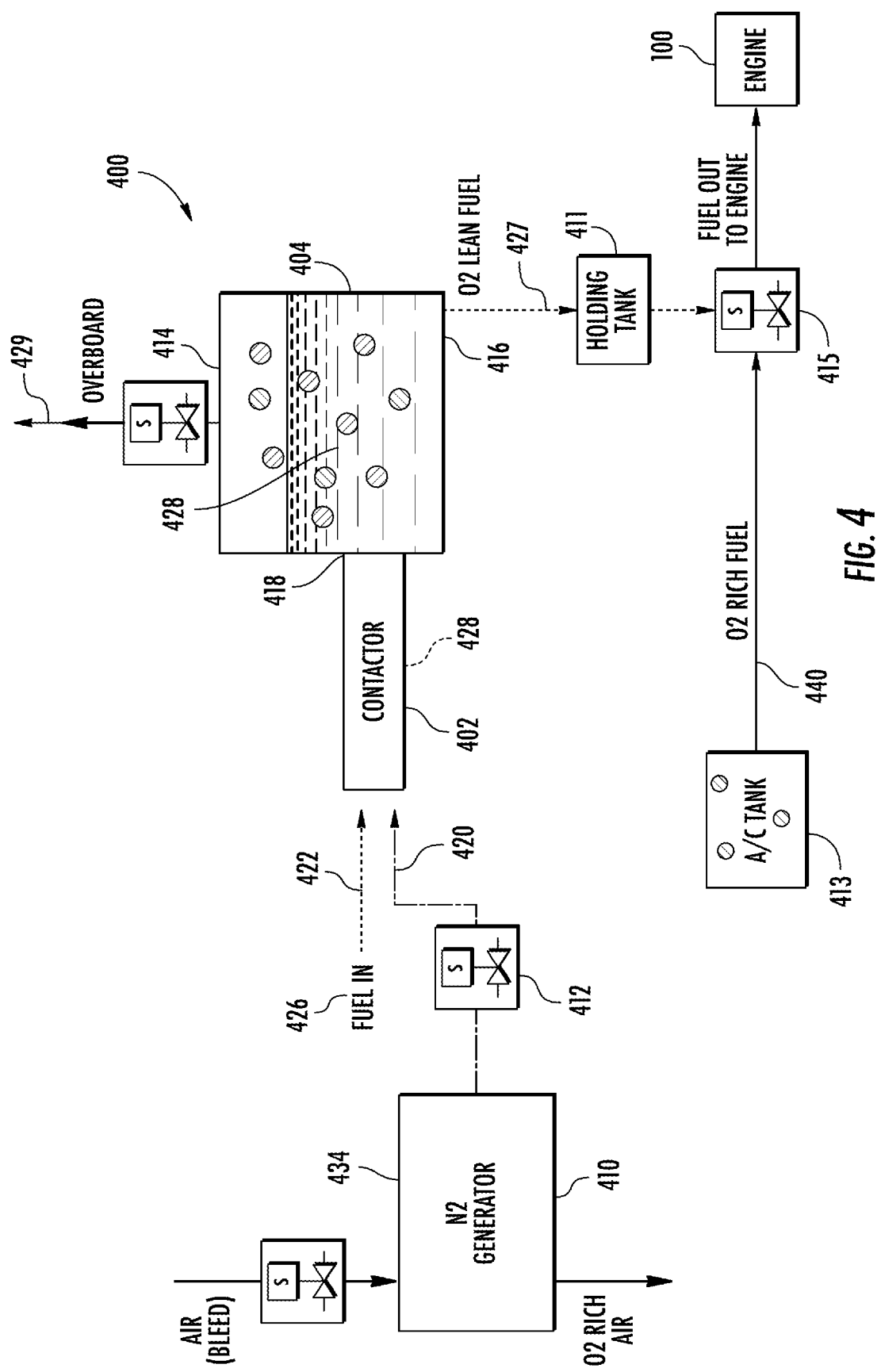
FIG. 4 is a schematic view of a fuel oxygen reduction system in accordance with an exemplary embodiment of the present disclosure.

Referring now to FIG. 4, a schematic drawing of a fuel oxygen reduction system 400 for a gas turbine engine in accordance with an exemplary embodiment of the present disclosure is provided. In at least certain exemplary embodiments, the exemplary fuel oxygen reduction system 400 depicted may be incorporated into, e.g., the exemplary engine 100 described above with reference to FIG. 1 (e.g., may be the fuel oxygen reduction unit 144 depicted in FIG. 1 and described above). Fuel oxygen reduction system 400 of the present disclose may be a static system that is configured and sized for operating at a prescribed operating condition.

Figure 3C:
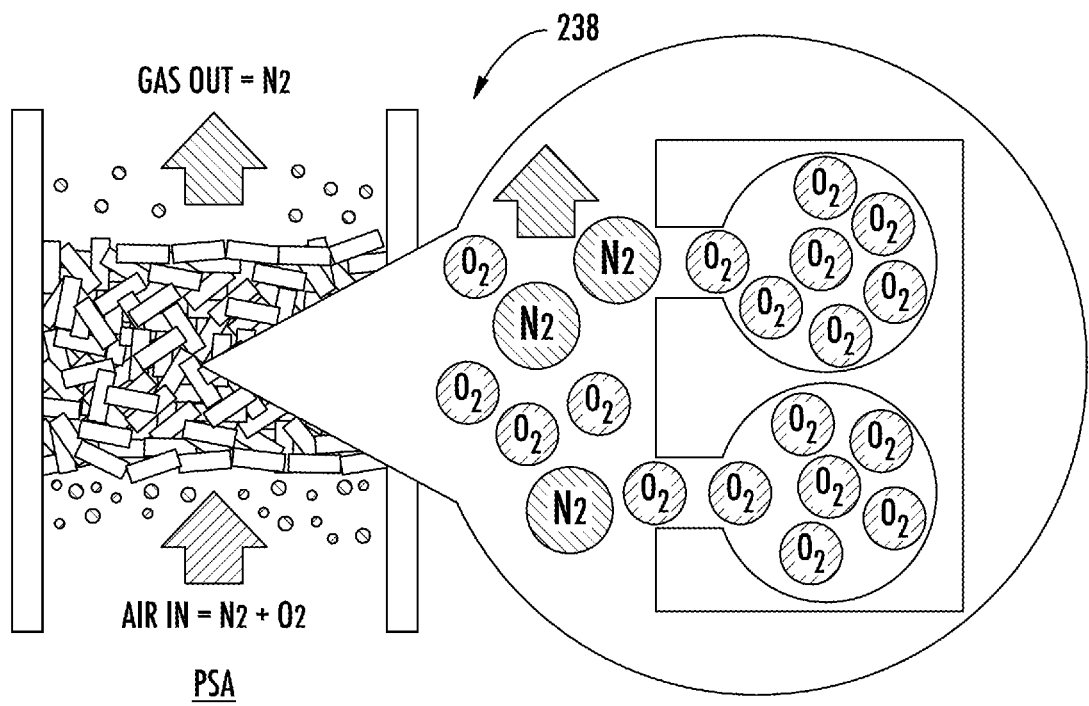

The embodiment illustrated in FIG. 4 includes similar components to the embodiments illustrated in FIGS. 2-3A. For the sake of brevity, these similar components will not all be discussed in conjunction with the embodiment illustrated in FIG. 4.

As will be appreciated from the discussion herein, in an exemplary embodiment, the exemplary fuel oxygen reduction system 400 of FIG. 4 generally includes a contactor 402, a separator 404, a stripping gas source 410, a storage tank 411, a first valve 412, a primary tank 413, and a second valve 415. In an exemplary embodiment, the exemplary fuel oxygen reduction system 400 generally defines a single pass gas flowpath or system 406 from the stripping gas source 410 to the contactor 402 and out the separator 404 as described herein. In an exemplary embodiment of the present disclosure, the primary tank 413 defines a first volume, the storage tank 411 defines a second volume, and the second volume is less than 20% of the first volume. However, it is contemplated that the second volume may have other sizes relative to the first volume.

In exemplary embodiments, the contactor 402 may be configured in any suitable manner to substantially mix a received gas and liquid flow. For example, the contactor 402 may, in certain embodiments, be a mechanically driven contactor (e.g., having paddles for mixing the received flows), or alternatively may be a passive contactor for mixing the received flows using, at least in part, a pressure and/or flowrate of the received flows. For example, a passive contactor may include one or more turbulators, a venturi mixer, etc.

Fuel oxygen reduction system 400 of the present disclosure provides a system that continuously deoxygenates fuel and then stores the deoxygenated fuel in the storage tank 411. This deoxygenated fuel stored in storage tank 411 can then be provided to the engine at a prescribed operating condition.

It will be appreciated that the fuel oxygen reduction system 400 generally provides for a flow of stripping gas 420 to the contactor 402 for mixing with a fuel flow during operation to continuously provide deoxygenated fuel that can be stored in storage tank 411.

Referring to FIG. 4, in an exemplary embodiment, the stripping gas source 410 is an inert gas generator 434. As described above, the inert gas generator 434 is able to take air from some source, e.g., air from atmosphere, air from a pump, air from the compressor bleed, and generate a continuous supply of inert gas.

During typical operations, a flow of stripping gas 420 flows to the contactor 402, wherein the stripping gas 420 is mixed with the flow of inlet fuel 426 from the inlet fuel line 422 to generate a fuel gas mixture 428. The fuel gas mixture 428 generated within the contactor 402 is provided to the inlet 418 of the separator 404. The stripping gas source 410 is selectively in fluid communication with a stripping gas inlet of the contactor 402 for selectively introducing a stripping gas to the contactor 402.

As described above, the stripping gas source 410 is in fluid communication with the contactor 402 via a first valve 412, which may be actuatable to supply the stripping gas flow 420 to the contactor 402. Referring to FIG. 4, the first valve 412 is downstream of the stripping gas source 410 and upstream of the contactor 402. The first valve 412 is transitionable between a closed position in which the stripping gas source 410 is not in fluid communication with the contactor 402, and an open position in which the stripping gas 420 flows to the contactor 420.

Generally, it will be appreciated that during operation of the fuel oxygen reduction system 400, the inlet fuel 426 provided through the inlet fuel line 422 to the contactor 402 may have a relatively high oxygen content. The stripping gas 420 provided to the contactor 402 may have a relatively low oxygen content or other specific chemical structure. Within the contactor 402, the inlet fuel 426 is mixed with the stripping gas 420, resulting in the fuel gas mixture 428. As a result of such mixing a physical exchange may occur whereby at least a portion of the oxygen within the inlet fuel 426 is transferred to the stripping gas 420, such that the fuel component of the mixture 428 has a relatively low oxygen content (as compared to the inlet fuel 426 provided through inlet fuel line 422) and the stripping gas component of the mixture 428 has a relatively high oxygen content (as compared to the inlet stripping gas 420 provided to the contactor 402).

Within the separator 404 the relatively high oxygen content stripping gas 420 is then separated from the relatively low oxygen content fuel 426 back into respective flows of an outlet stripping gas 429 and outlet fuel 427. The separator 404 is configured to separate the fuel/gas mixture 428 into an outlet stripping gas flow 429 and an outlet fuel flow 427 and provide the outlet stripping gas flow 429 to the stripping gas outlet 414 and the outlet fuel flow 427 to the fuel outlet 416. In an exemplary embodiment, the outlet stripping gas flow 429 is vented out to atmosphere downstream of the separator 404.

Further, it will be appreciated that the outlet fuel 427 provided to the fuel outlet 416, having interacted with the stripping gas 420, may have a relatively low oxygen content, such that a relatively high amount of heat may be added thereto with a reduced risk of the fuel coking (i.e., chemically reacting to form solid particles which may clog up or otherwise damage components within the fuel flow path).

This deoxygenated fuel 427 is then provided and stored in storage tank 411 and can be provided to the engine at a prescribed operating condition.

Referring to FIG. 4, in an exemplary embodiment, the fuel oxygen reduction system 400 includes a primary tank 413 containing a primary fuel flow 440 and a second valve 415 that is downstream of the storage tank 411 and that is downstream of the primary tank 413. The primary fuel flow 440 has a higher oxygen content than the deoxygenated fuel 427.

The second valve 415 is transitionable between a first position in which the primary tank 413 is in fluid communication with the engine 100, and a second position in which the storage tank 411 is in fluid communication with the engine 100. With the second valve 415 in the first position, the primary fuel flow 440 from the primary tank 413 is provided to the engine 100. With the second valve 415 in the second position, the deoxygenated fuel 427 from the storage tank 411 is provided to the engine 100. In this manner, the fuel oxygen reduction system 400 of the present disclosure allows a switch that can transition from providing a primary fuel flow 440 to the engine 100 or a deoxygenated fuel 427 to the engine 100.

The fuel oxygen reduction system 400 includes a second valve 415 that transitions to the second position at a prescribed operating condition. In this manner, the deoxygenated fuel 427 from the storage tank 411 is provided to the engine 100 only during desired engine parameters, e.g., parameters indicating the engine 100 is at the end of the cycle. The prescribed operating condition can be any desired engine parameter. For example, the prescribed operating condition may be a weight on wheels condition indicating the end of an engine cycle. Also, the prescribed operating condition may be an engine speed condition, time condition, or other engine parameter condition.

Figure 5:
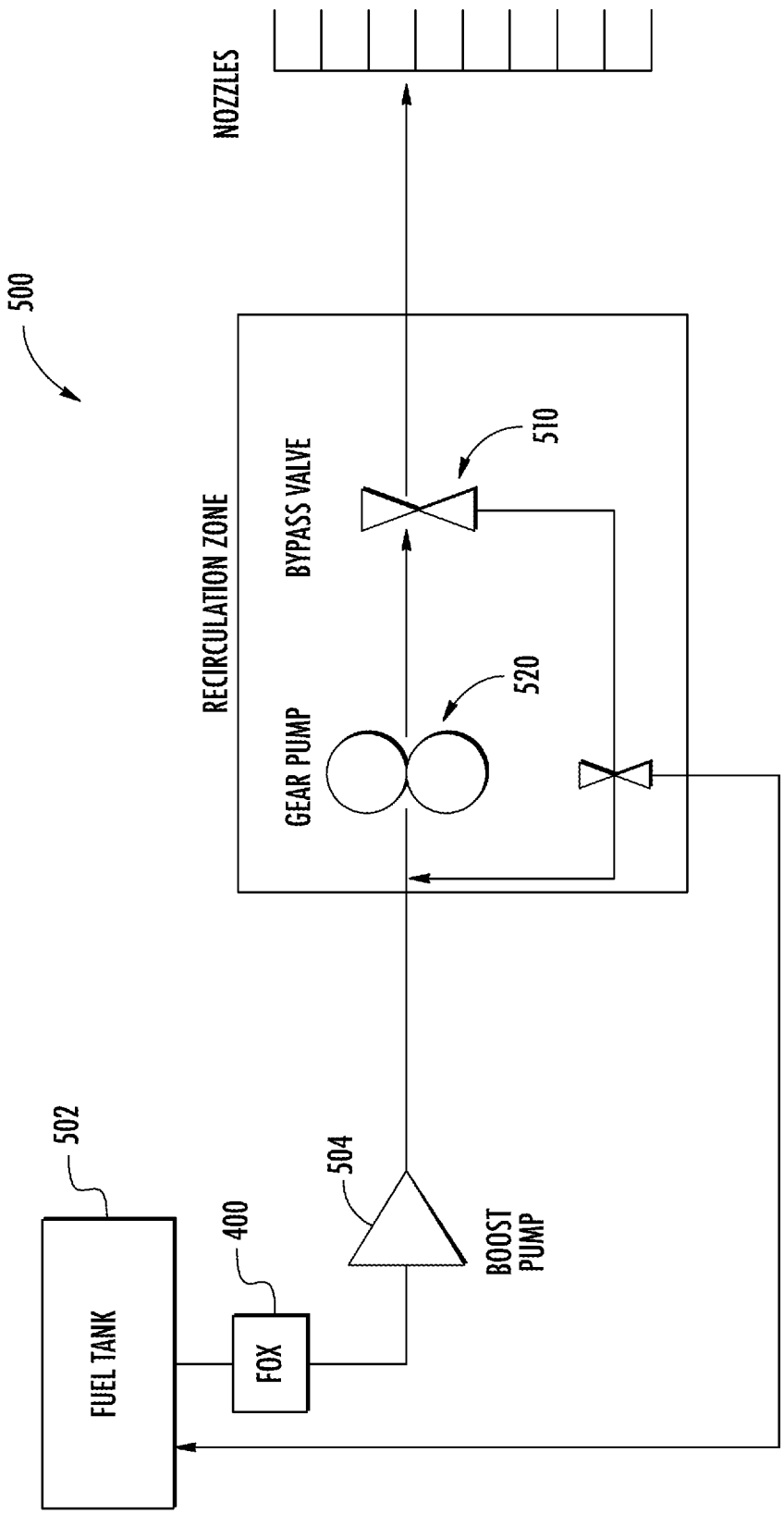
FIG. 5 is a schematic view of a fuel oxygen reduction system in accordance with another exemplary embodiment of the present disclosure.

Referring now to FIG. 5, a schematic drawing of a fuel oxygen reduction system 500 for a gas turbine engine in accordance with another exemplary embodiment of the present disclosure is provided. In at least certain exemplary embodiments, the exemplary fuel oxygen reduction system 500 depicted may be incorporated into, e.g., the exemplary engine 100 described above with reference to FIG. 1 (e.g., may be the fuel oxygen reduction unit 144 depicted in FIG. 1 and described above).

The embodiment illustrated in FIG. 5 includes similar components to the embodiment illustrated in FIG. 4. For the sake of brevity, these similar components will not all be discussed in conjunction with the embodiment illustrated in FIG. 5.

Referring to FIG. 5, the fuel oxygen reduction system 500 for a gas turbine engine includes a fuel tank 502, a fuel oxygen reduction system 400 as shown in FIG. 4, a boost pump 504, a set of valves 510, and a set of pumps 520. The fuel oxygen reduction system 500 can be utilized with the fuel oxygen reduction system 400 shown in FIG. 4 and provides a set of valves 510, a set of pumps 520, and a fuel system 500 that could use its own pressure to drain out its oxygen rich fuel and then pump in a flow of deoxygenated fuel 427 (FIG. 4) to replenish the fuel system. In other words, a system 500 that could quickly and efficiently switch out oxygen rich fuel for a flow of deoxygenated fuel 427 (FIG. 4) in a fuel system 500.

In embodiments of the present disclosure, the fuel oxygen reduction system 400 can be positioned before or after the boost pump 504.

Figure 6:
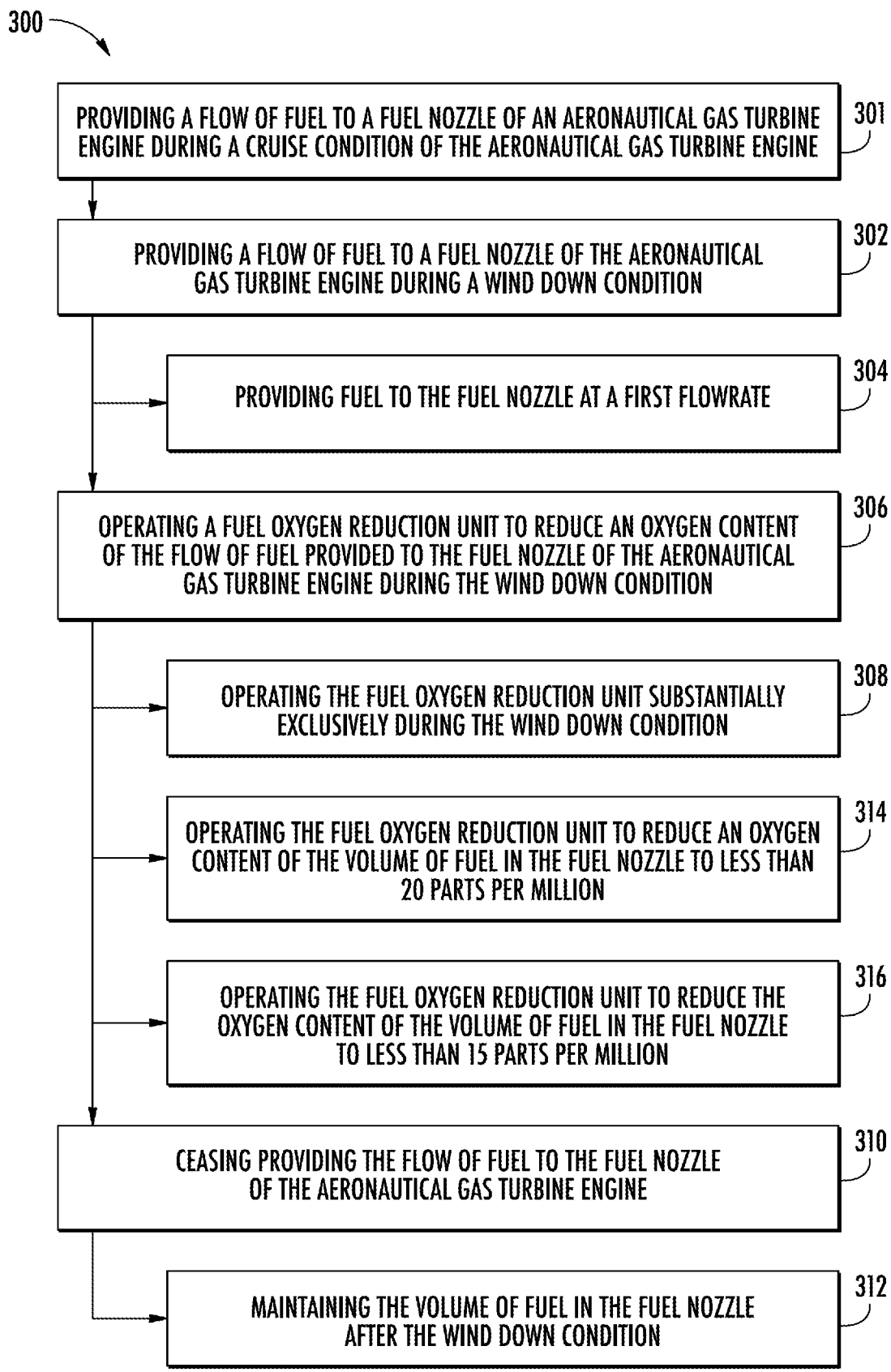
FIG. 6 is a flow diagram of a method of operating a fuel system for an aeronautical gas turbine engine in accordance with an aspect of the present disclosure.

Referring now to FIG. 6, a flow diagram of a method 300 of operating a fuel system for an aeronautical gas turbine engine is provided. The method 300 may be utilized with one or more of the exemplary fuel systems, gas turbine engines, etc. described above, or alternatively may be utilized with any other suitable fuel system.

The method 300 includes operating the aeronautical gas turbine engine during a cruise condition. More specifically, the method 300 includes at (301) providing a flow of fuel to a fuel nozzle of the aeronautical gas turbine engine during a cruise condition of the aeronautical gas turbine engine. The method 300 further includes operating the aeronautical gas turbine engine in a wind down condition. More specifically, the method 300 includes at (302) providing a flow of fuel to the fuel nozzle of the aeronautical gas turbine engine during a wind down condition. The wind down condition, as noted above, may be an engine operating condition or sequence of operating conditions occurring as the engine transitions to being in a completely turned-off condition (i.e., when fuel is no longer provided to fuel nozzle(s), and the shaft(s) of the engine are not rotating, or are rotating at a low speed). The wind down condition may include a ground idling condition of the engine as the engine is taxiing to its gate at the end of a flight mission (e.g., for commercial aircraft) or hanger, and/or a shutdown sequence of the engine in which it transitions from the ground idling condition to the completely turned off condition. In such a manner, it will be appreciated that providing the flow of fuel to the fuel nozzle at (302) includes at (304) providing fuel to the fuel nozzle at a first flowrate to facilitate the engine operating at the desire operating speed (e.g., idle).

The exemplary method 300 further includes at (306) operating a fuel oxygen reduction unit to reduce an oxygen content of the flow of fuel provided to the fuel nozzle of the aeronautical gas turbine engine during the wind down condition. The fuel oxygen reduction unit may be configured in a similar manner as one or more of the exemplary secondary fuel oxygen reduction units described above with reference to FIGS. 1 through 5, or alternatively may be any other suitable fuel oxygen reduction unit.

In such a manner, it will be appreciated that in at least certain exemplary aspects, operating the fuel oxygen reduction unit at (306) includes at (308) operating the fuel oxygen reduction unit substantially exclusively during the wind down condition. In the context of this step, "substantially exclusively" refers to at least 90% of a total operating time within a particular flight mission of an aircraft incorporating the fuel oxygen reduction unit.

In such a manner, it will be appreciated that the fuel oxygen reduction unit may define a maximum operating time of one hour or less per flight mission, such as 30 minutes or less per flight mission.

Additionally, or alternatively, it will be appreciated that an aircraft incorporating the aeronautical gas turbine engine may define a maximum fuel capacity (e.g., a maximum amount of fuel that may be loaded in the fuel tanks of the aircraft during typical operations). The fuel oxygen reduction unit may define a maximum volume of fuel throughput per flight mission, with the maximum volume of fuel throughput of the fuel oxygen reduction unit being less than 10 percent of the maximum fuel capacity of the aircraft.

Additionally, or alternatively, still, the fuel oxygen reduction unit may define a maximum fuel flowrate capacity. The maximum fuel flowrate capacity of the fuel oxygen reduction unit may refer to a maximum flowrate that the fuel oxygen reduction unit may effectively process (i.e., may process at an oxygen reduction level of at least 50% of its maximum oxygen reduction level). Further, as noted above, the method 300 includes operating the aeronautical gas turbine engine during a cruise condition. Operating the aeronautical gas turbine engine during the cruise condition may include providing a fuel flow to a combustion section of the aeronautical gas turbine engine at a cruise condition flowrate. The maximum fuel flowrate capacity of the fuel oxygen reduction unit is less than the cruise condition flowrate. In such a manner, it will be appreciated that the fuel oxygen reduction unit is not a steady state fuel oxygen reduction unit, and instead is a special purpose fuel oxygen reduction unit.

In such a manner, it will be appreciated that in other exemplary aspects, the fuel oxygen reduction unit is configured to operate substantially continuously. In such a configuration, the fuel oxygen reduction unit may still define the maximum fuel flowrate capacity. The maximum fuel flowrate capacity may still be less than the cruise condition flowrate, and the fuel provided to the gas turbine engine may simply not be effectively conditioned. Notably, however, it will be appreciated that depending on the operating temperatures of the gas turbine engine, the fuel flowrate, the resonance time of the fuel within a combustion section of the gas turbine engine, etc., the fuel may not need to be effectively conditioned by the fuel oxygen reduction unit during, e.g., cruise operations. The fuel oxygen reduction unit may still effectively treat substantially all of the fuel flow to the gas turbine engine during a wind down condition.

Referring still to the exemplary aspect of FIG. 6, the method 300 further includes at (310) ceasing providing the flow of fuel to the fuel nozzle of the aeronautical gas turbine engine, the fuel nozzle comprising a volume of fuel after ceasing providing the flow of fuel to the fuel nozzle. In such a manner, it will be appreciated that in the exemplary aspect shown, ceasing providing the flow of fuel to the fuel nozzle of the aeronautical gas turbine engine at (310) includes at (312) maintaining the volume of fuel in the fuel nozzle after the wind down condition. Notably, the volume of fuel remaining in the fuel nozzle may be at least about 10 milliliters, and ceasing providing the flow of fuel to the fuel nozzle of the aeronautical gas turbine engine at (310) may immediately follow the wind down condition of the engine. In exemplary embodiments, the volume of fuel may be at least 10 milliliters of fuel, such as at least 20 milliliters of fuel, such as at least 50 milliliters of fuel, such as at least 100 milliliters of fuel and up to three (3) liters of fuel.

The exemplary method 300 may facilitate preventing a fuel within the fuel nozzles from coking or otherwise deteriorating beyond a threshold amount after the wind down condition of the engine, despite a potentially relatively high temperature that may be reached by the fuel as a result of heat soak-back. For example, in the exemplary aspect depicted, it will be appreciated that operating the fuel oxygen reduction unit at (306) includes at (314) operating the fuel oxygen reduction unit to reduce an oxygen content of the volume of fuel in the fuel nozzle to less than 20 parts per million, and more specifically includes at (316) operating the fuel oxygen reduction unit to reduce the oxygen content of the volume of fuel in the fuel nozzle to less than 15 parts per million.

Notably, the method 300 further includes at (315) operating the aeronautical gas turbine engine during an idle condition. The gas turbine engine defines a turbine inlet temperature greater than 1000 degrees Fahrenheit while the aeronautical gas turbine engine is operating during the idle condition at (315). In certain exemplary embodiments, the turbine inlet temperature, T3, which may be indicative of an overall temperature of the core, may be at least 1000 degrees Fahrenheit during idle standard day conditions (e.g., sea level and 70 degrees Fahrenheit ambient), such as at least 1100 degrees Fahrenheit, such as at least 1250 degrees Fahrenheit, such as at least 1400 degrees Fahrenheit, such as at least 1500 degrees Fahrenheit, such as at least 1550 degrees Fahrenheit, and up to 3500 degrees Fahrenheit.

Further, it will be appreciated that from the discussions above with respect to FIGS. 1 through 6, the core of the engine may define a relatively high thermal mass. In such a manner, it will be appreciated that the combination of the relatively high turbine inlet temperatures during idle and the relatively high thermal mass, the soak-back may be relatively significant, such that the reduction in oxygen content of the volume of fuel remaining in the fuel nozzle is necessary to reduce a risk of the fuel coking beyond a certain threshold.

Such may allow the volume of fuel remaining in the fuel nozzles to withstand the relatively high temperatures without coking beyond a threshold level.

It will further be appreciated that in certain exemplary aspects, an oxygen level of a fuel flow to the fuel nozzle may be monitored and/or reduced during other operating conditions of the engine. For example, referring now to FIG. 7, a flow diagram of a method 300 for operating a fuel system for an aeronautical gas turbine engine in accordance with another exemplary aspect of the present disclosure is provided. The method 300 may be utilized with one or more of the exemplary fuel systems, gas turbine engines, etc. described above, or alternatively may be utilized with any other suitable fuel system.

Figure 7:
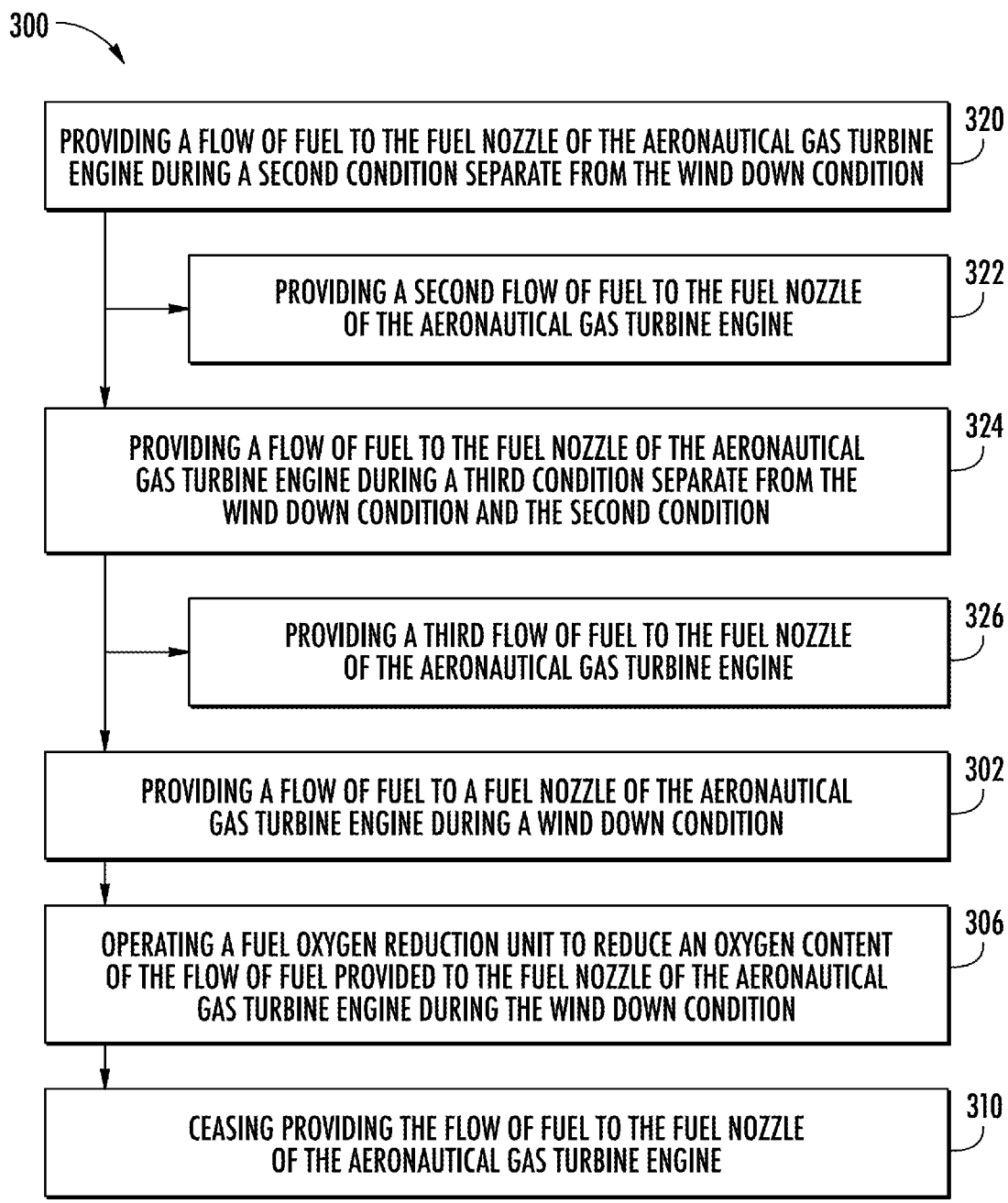
FIG. 7 is a flow diagram of a method of operating a fuel system for an aeronautical gas turbine engine in accordance with another aspect of the present disclosure.

The method 300 of FIG. 7 is similar to the method 300 of FIG. 6. For example, the method 300 of FIG. 7 generally includes at (302) providing a flow of fuel to a fuel nozzle of the aeronautical gas turbine engine during a wind down condition; at (306) operating a fuel oxygen reduction unit to reduce an oxygen content of the flow of fuel provided to the fuel nozzle of the aeronautical gas turbine engine during the wind down condition; and at (310) ceasing providing the flow of fuel to the fuel nozzle of the aeronautical gas turbine engine.

However, for the exemplary aspect of FIG. 7, an oxygen level of a fuel flow to the fuel nozzle may be further monitored and/or reduced during other operating conditions of the engine.

For example, for the exemplary aspect of FIG. 7, the method 300 includes at (320) providing a flow of fuel to the fuel nozzle of the aeronautical gas turbine engine during a second condition separate from the wind down condition. For the exemplary aspect depicted, an oxygen content of the flow of fuel to the fuel nozzle of the aeronautical gas turbine engine during the second condition is greater than the oxygen content of the volume of fuel in the fuel nozzle after ceasing providing the flow of fuel to the fuel nozzle. For example, in certain exemplary aspects, the oxygen content of the flow of fuel to the fuel nozzle of the aeronautical gas turbine engine during the flight condition is at least 1.5 times greater than the oxygen content of the volume of fuel in the fuel nozzle after ceasing providing the flow of fuel to the fuel nozzle.

More specifically, for the embodiment shown, providing the flow of fuel to the fuel nozzle during the second condition at (320) includes at (322) providing a second flow of fuel to the fuel nozzle of the aeronautical gas turbine engine. An oxygen content of the volume of fuel in the fuel nozzle after ceasing providing the flow of fuel to the fuel nozzle at (310) is a first value, and the oxygen content of the second flow of fuel provided to the fuel nozzle during the second condition at (322) is a second value. The second value is equal to at least 1.5 times the first value. More specifically, in at least certain exemplary aspects the second value is equal to at least three times the first value, such as at least five times the first value, such as up to 100 times the first value.

In certain exemplary aspects, the second condition is a flight condition of the engine. For example, in certain exemplary aspects, the second condition is a takeoff flight condition, a climb flight condition, or both.

Referring still to the exemplary aspect of FIG. 7, the method further includes at (324) providing a flow of fuel to the fuel nozzle of the aeronautical gas turbine engine during a third condition separate from the wind down condition and the second condition. Providing the flow of fuel to the fuel nozzle during the third condition at (324) includes at (326) providing a third flow of fuel to the fuel nozzle of the aeronautical gas turbine engine during the third. Similar to the exemplary aspects above, the oxygen content of the third flow of fuel provided to the fuel nozzle during the third condition is a third value. The third value is less than the second value and greater than the first value. With such an exemplary aspect, it will be appreciated that the second condition is a relatively high power flight condition, and the third condition is a relatively low power flight condition. For example, the second condition may be a takeoff flight condition, a climb flight condition, or both, and the third condition may be a cruise flight condition.

In certain exemplary aspects, a primary fuel oxygen reduction unit may be operated during the second and third conditions (and optionally during the first condition) (see FIG. 1).

In such a manner, it will be appreciated that a fuel flow to the fuel nozzles is higher during the second and third conditions, than during the wind down condition. In such a manner the fuel is not exposed to the high temperatures for as long, and the volume of fuel thorough the fuel nozzle is greater, such that there is less risk of fuel coking within the nozzle.

In an exemplary aspect of the present disclosure, a method is provided for operating a fuel delivery system for a gas turbine engine. The method includes receiving an inlet fuel flow in a fuel oxygen reduction unit for reducing an amount of oxygen in the inlet fuel flow using a stripping gas flow through a stripping gas flowpath; and passing the stripping gas flow through the fuel oxygen reduction unit a single time.

Further aspects of the invention are provided by the subject matter of the following clauses:

1. A fuel oxygen reduction unit for an engine comprising: an inlet fuel line; a stripping gas source; a contactor selectively in fluid communication with the stripping gas source, the inlet fuel line, or both to form a fuel/gas mixture; and a separator that receives the fuel/gas mixture, the separator configured to separate the fuel/gas mixture into an outlet stripping gas flow and an outlet fuel flow; wherein a flow of stripping gas passes through the fuel oxygen reduction unit a single time.

2. The fuel oxygen reduction unit of any preceding clause, further comprising a valve downstream of the stripping gas source and upstream of the contactor, wherein the valve is transitionable between a closed position in which the stripping gas source is not in fluid communication with the contactor, and an open position in which the stripping gas flows to the contactor.

3. The fuel oxygen reduction unit of any preceding clause, wherein the valve transitions to the open position at a prescribed operating condition.

4. The fuel oxygen reduction unit of any preceding clause, wherein the prescribed operating condition is a weight on wheels condition.

5. The fuel oxygen reduction unit of any preceding clause, wherein the prescribed operating condition is an engine speed condition.

6. The fuel oxygen reduction unit of any preceding clause, wherein the prescribed operating condition is a wind down condition of the engine.

7. The fuel oxygen reduction unit of any preceding clause, wherein the fuel oxygen reduction unit defines a maximum continuous operating time of one hour or less.

8. The fuel oxygen reduction unit of any preceding clause, wherein the separator includes an inlet in fluid communication with the contactor that receives the fuel/gas mixture, a fuel outlet, and a stripping gas outlet, wherein the separator is configured to separate the fuel/gas mixture into an outlet stripping gas flow and an outlet fuel flow and provide the outlet stripping gas flow to the stripping gas outlet and the outlet fuel flow to the fuel outlet.

9. The fuel oxygen reduction unit of any preceding clause, wherein the outlet stripping gas flow is vented out to atmosphere downstream of the separator.

10. The fuel oxygen reduction unit of any preceding clause, wherein the stripping gas source comprises a rechargeable bottle of inert gas.

11. The fuel oxygen reduction unit of any preceding clause, wherein the stripping gas source comprises an inert gas generator.

12. The fuel oxygen reduction unit of any preceding clause, wherein the outlet fuel flow has a lower oxygen content than the inlet fuel flow, and wherein the outlet stripping gas flow has a higher oxygen content than the inlet stripping gas flow.

13. A fuel oxygen reduction system for an engine comprising: an inlet fuel line; a stripping gas source; a contactor selectively in fluid communication with the stripping gas source, the inlet fuel line, or both to form a fuel/gas mixture; a separator that receives the fuel/gas mixture, the separator configured to separate the fuel/gas mixture into an outlet stripping gas flow and an outlet fuel flow; and a storage tank that receives the outlet fuel flow.

14. The fuel oxygen reduction system of any preceding clause, wherein the stripping gas source comprises an inert gas generator.

15. The fuel oxygen reduction system of any preceding clause, further comprising a primary tank containing a primary fuel flow; and a valve downstream of the storage tank and the primary tank, wherein the valve is transitionable between a first position in which the primary tank is in fluid communication with the engine, and a second position in which the storage tank is in fluid communication with the engine.

16. The fuel oxygen reduction system of any preceding clause, wherein the second valve transitions to the second position at a prescribed operating condition.

17. The fuel oxygen reduction system of any preceding clause, wherein the prescribed operating condition is a weight on wheels condition.

18. The fuel oxygen reduction system of any preceding clause, wherein the prescribed operating condition is an engine speed condition.

19. The fuel oxygen reduction system of any preceding clause, wherein the primary tank defines a first volume, wherein the storage tank defines a second volume, and wherein the second volume is less than 20% of the first volume.

20. The fuel oxygen reduction system of any preceding clause, wherein the separator includes an inlet in fluid communication with the contactor that receives the fuel/gas mixture, a fuel outlet, and a stripping gas outlet, wherein the separator is configured to provide the outlet stripping gas flow to the stripping gas outlet and the outlet fuel flow to the storage tank via the fuel outlet.

21. A method of operating a fuel system for an aeronautical gas turbine engine, the method comprising: providing a flow of fuel to a fuel nozzle of the aeronautical gas turbine engine during a wind down condition; operating a fuel oxygen reduction unit to reduce an oxygen content of the flow of fuel provided to the fuel nozzle of the aeronautical gas turbine engine during the wind down condition; and ceasing providing the flow of fuel to the fuel nozzle of the aeronautical gas turbine engine, the fuel nozzle comprising a volume of fuel after ceasing providing the flow of fuel to the fuel nozzle; wherein operating the fuel oxygen reduction unit comprises operating the fuel oxygen reduction unit to reduce an oxygen content of the volume of fuel in the fuel nozzle to less than 20 parts per million.

22. The method of one or more of these clauses, wherein operating the fuel oxygen reduction unit comprises operating the fuel oxygen reduction unit to reduce the oxygen content of the volume of fuel in the fuel nozzle to less than 15 parts per million.

23. The method of one or more of these clauses, further comprising: operating the aeronautical gas turbine engine during an idle condition, wherein the gas turbine engine defines a turbine inlet temperature greater than 1000 degrees Fahrenheit while the aeronautical gas turbine engine is operating during the idle condition.

24. The method of one or more of these clauses, wherein the aeronautical gas turbine engine comprises a core defining a thermal mass.

25. The method of one or more of these clauses, wherein operating the fuel oxygen reduction unit comprises operating the fuel oxygen reduction unit substantially exclusively during the wind down condition.

26. The method of one or more of these clauses, wherein the fuel oxygen reduction unit defines a maximum operating time of one hour or less per flight mission.

27. The method of one or more of these clauses, wherein the aeronautical gas turbine engine is incorporated into an aircraft, wherein the aircraft defines a maximum fuel capacity, wherein the fuel oxygen reduction unit defines a maximum volume of fuel throughput per flight mission, and wherein the maximum volume of fuel throughput is less than 10 percent of the maximum fuel capacity of the aircraft.

28. The method of one or more of these clauses, further comprising: operating the aeronautical gas turbine engine during a cruise condition, wherein operating the aeronautical gas turbine engine during the cruise condition comprises providing a fuel flow to a combustion section of the aeronautical gas turbine engine at a cruise condition flowrate, wherein the fuel oxygen reduction unit defines a maximum fuel flowrate capacity, and wherein the maximum fuel flowrate capacity of the fuel oxygen reduction unit is less than the cruise condition flowrate.

29. The method of one or more of these clauses, further comprising: providing a flow of fuel to the fuel nozzle of the aeronautical gas turbine engine during a second condition separate from the wind down condition, wherein an oxygen content of the flow of fuel to the fuel nozzle of the aeronautical gas turbine engine during the second condition is greater than the oxygen content of the volume of fuel in the fuel nozzle after ceasing providing the flow of fuel to the fuel nozzle.

30. The method of one or more of these clauses, wherein the oxygen content of the flow of fuel to the fuel nozzle of the aeronautical gas turbine engine during the flight condition is at least 1.5 times greater than the oxygen content of the volume of fuel in the fuel nozzle after ceasing providing the flow of fuel to the fuel nozzle.

31. The method of one or more of these clauses, further comprising: providing a second flow of fuel to the fuel nozzle of the aeronautical gas turbine engine during a second condition separate from the wind down condition, wherein an oxygen content of the volume of fuel in the fuel nozzle after ceasing providing the flow of fuel to the fuel nozzle is a first value, wherein the oxygen content of the second flow of fuel provided to the fuel nozzle during the second condition is a second value, and wherein the second value is equal to at least 1.5 times the first value.

32. The method of one or more of these clauses, wherein the second value is equal to at least 3 times the first value.

33. The method of one or more of these clauses, wherein the second condition is a flight condition.

34. The method of one or more of these clauses, wherein the second condition is a takeoff flight condition, a climb flight condition, or both.

35. The method of one or more of these clauses, further comprising: providing a third flow of fuel to the fuel nozzle of the aeronautical gas turbine engine during a third condition separate from the wind down condition, wherein the oxygen content of the third flow of fuel provided to the fuel nozzle during the third condition is a third value, wherein the third value is less than the first value, wherein the second condition is a relatively high power flight condition, and wherein the third condition is a relatively low power flight condition.

36. The method of one or more of these clauses, wherein the volume of fuel in the fuel nozzle is at least 10 milliliters of fuel.

37. The method of one or more of these clauses, wherein ceasing providing the flow of fuel to the fuel nozzle of the aeronautical gas turbine engine comprises maintaining the volume of fuel in the fuel nozzle during and after the wind down condition.

38. A method is provided for operating a fuel delivery system for a gas turbine engine. The method includes receiving an inlet fuel flow in a fuel oxygen reduction unit for reducing an amount of oxygen in the inlet fuel flow using a stripping gas flow through a stripping gas flowpath; and passing the stripping gas flow through the fuel oxygen reduction unit a single time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method for operating a fuel delivery system for a gas turbine engine comprising:
    receiving a stripping gas flow from a rechargeable bottle of stripping gas to a fuel oxygen reduction unit;
    receiving an inlet fuel flow in the fuel oxygen reduction unit for reducing an amount of oxygen in the inlet fuel flow using the stripping gas flow through a stripping gas flowpath; and
    passing the stripping gas flow through the fuel oxygen reduction unit a single time.

2. The method of claim 1, further comprising:
    operating the gas turbine engine during an idle condition, wherein the gas turbine engine defines a turbine inlet temperature greater than 1000 degrees Fahrenheit while the gas turbine engine is operating during the idle condition.

3. The method of claim 1, wherein operating the fuel oxygen reduction unit comprises operating the fuel oxygen reduction unit to reduce an oxygen content of a volume of fuel in a fuel nozzle of the gas turbine engine to less than 15 parts per million.

4. The method of claim 1, wherein operating the fuel oxygen reduction unit comprises operating the fuel oxygen reduction unit substantially exclusively during a wind down condition.

5. The method of claim 4, further comprising:
    providing a first flow of fuel to a fuel nozzle of the gas turbine engine during a second condition separate from the wind down condition, wherein a first oxygen content of the first flow of fuel to the fuel nozzle of the gas turbine engine during the second condition is greater than a second oxygen content of a volume of fuel in the fuel nozzle after ceasing providing the first flow of fuel to the fuel nozzle.

6. The method of claim 5, wherein the first oxygen content of the first flow of fuel to the fuel nozzle of the gas turbine engine during the second condition is at least 1.5 times greater than the second oxygen content of the volume of fuel in the fuel nozzle after ceasing providing the first flow of fuel to the fuel nozzle.

7. The method of claim 5, wherein the second condition is a flight condition.

8. The method of claim 5, wherein the second condition is a takeoff flight condition, a climb flight condition, or both.

9. The method of claim 5, wherein ceasing providing the first flow of fuel to the fuel nozzle of the gas turbine engine comprises maintaining the volume of fuel in the fuel nozzle during and after the wind down condition.

10. The method of claim 4, further comprising:
providing a second flow of fuel to a fuel nozzle of the gas turbine engine during a second condition separate from the wind down condition, wherein a first oxygen content of a volume of fuel in the fuel nozzle after ceasing providing the second flow of fuel to the fuel nozzle is a first value, wherein a second oxygen content of the second flow of fuel provided to the fuel nozzle during the second condition is a second value, and wherein the second value is equal to at least 1.5 times the first value.

11. The method of claim 10, wherein the second value is equal to at least 3 times the first value.

12. The method of claim 10, wherein the second condition is a flight condition.

13. The method of claim 10, wherein the second condition is a takeoff flight condition, a climb flight condition, or both.

14. The method of claim 10, further comprising:
providing a third flow of fuel to the fuel nozzle of the gas turbine engine during a third condition separate from the wind down condition, wherein a third oxygen content of the third flow of fuel provided to the fuel nozzle during the third condition is a third value, wherein the third value is less than the first value, wherein the second condition is a relatively high power flight condition, and wherein the third condition is a relatively low power flight condition.

15. The method of claim 10, wherein ceasing providing the second flow of fuel to the fuel nozzle of the gas turbine engine comprises maintaining the volume of fuel in the fuel nozzle during and after the wind down condition.

16. The method of claim 3, wherein the volume of fuel in the fuel nozzle is at least 10 milliliters of fuel.

17. The method of claim 1, further comprising:
operating the gas turbine engine during a cruise condition, wherein operating the gas turbine engine during the cruise condition comprises providing a fuel flow to a combustion section of the gas turbine engine at a cruise condition flowrate, wherein the fuel oxygen reduction unit defines a maximum fuel flowrate capacity, and wherein the maximum fuel flowrate capacity of the fuel oxygen reduction unit is less than the cruise condition flowrate.

18. The method of claim 1, wherein the gas turbine engine is incorporated into an aircraft, wherein the aircraft defines a maximum fuel capacity, wherein the fuel oxygen reduction unit defines a maximum volume of fuel throughput per flight mission, and wherein the maximum volume of fuel throughput is less than 10 percent of the maximum fuel capacity of the aircraft.

19. The method of claim 1, further comprising:
replenishing a supply of stripping gas to the rechargeable bottle of stripping gas using a stripping gas generator.

20. The method of claim 1, wherein the fuel oxygen reduction unit defines a maximum operating time of one hour or less per flight mission.

* * * * *